(12) United States Patent
Tuli

(10) Patent No.: US 6,256,651 B1
(45) Date of Patent: Jul. 3, 2001

(54) TIME MANAGEMENT WORKFLOW SOFTWARE

(75) Inventor: Raja Singh Tuli, Montreal (CA)

(73) Assignee: Raja Tuli, Montreal (CA)

( * ) Notice: Subject to any disclaimer, the term of this patent is extended or adjusted under 35 U.S.C. 154(b) by 0 days.

(21) Appl. No.: 08/879,795

(22) Filed: Jun. 20, 1997

(51) Int. Cl.$^7$ .................................................. G06F 15/16
(52) U.S. Cl. .............................. 707/526; 707/503; 705/7; 705/8; 705/9
(58) Field of Search .................................. 707/103, 503, 707/101, 501, 526; 364/401 R, 401; 705/8, 9, 7, 203; 468/0.05; 345/440, 443

(56) References Cited

U.S. PATENT DOCUMENTS

| | | | | |
|---|---|---|---|---|
| 5,016,170 | * | 5/1991 | Pollalis et al. ........................ | 364/401 |
| 5,375,201 | * | 12/1994 | Davoust ................................ | 395/161 |
| 5,440,681 | * | 8/1995 | Kudo ........................................ | 705/8 |
| 5,461,708 | * | 10/1995 | Kahn ..................................... | 395/140 |
| 5,548,506 | * | 8/1996 | Srinivasan ......................... | 364/401 R |
| 5,745,110 | * | 4/1998 | Ertemalp .............................. | 345/340 |
| 5,767,848 | * | 7/1998 | Matsuzaki et al. ................... | 345/331 |
| 5,890,130 | * | 3/1999 | Cox et al. ................................ | 705/7 |
| 5,940,804 | * | 8/1999 | Turley et al. ............................ | 705/9 |
| 5,974,391 | * | 10/1999 | Hongawa ................................ | 705/7 |
| 5,974,392 | * | 10/1999 | Endo ....................................... | 705/8 |
| 5,999,911 | * | 12/1999 | Berg et al. .............................. | 705/9 |
| 6,006,193 | * | 12/1999 | Gibson et al. ........................... | 705/8 |
| 6,018,716 | * | 1/2000 | Denardo et al. ......................... | 705/7 |
| 6,038,539 | * | 3/2000 | Maruyama et al. ..................... | 705/8 |

OTHER PUBLICATIONS

Digital: open season for solutions . . . , Gunnerson, G., PC magazine, v13, n11, p. 160(2), Jun. 14, 1994.*

DMS for Windows update to debut . . . , Higgins, S., PC Week, v10, n1, p. 80(1), Jan. 11, 1993.*

DMSs getting mix–and–match wardrobe, Musthaler, L., Network World, p. 38, Jan. 8, 1996.*

Path to Y our Development Tools, Weissman, S., Network World, p. 38 , Apr. 24, 1995.*

GroupWare Showdown, Garrett, M. H., ComputerWorld, p. 73, Sep. 2, 1996.*

Lotus' Domino: Sugar for Notes R4 servers, Goldberg, S., Network World, p. 16, Jul. 15, 1996.*

Workflow without tears . . . , Phillips, K., Corporate Computing , v2, n5, p. 54(1), May 1993.*

Microsoft Project for Windows Feature Guide, Microsoft Corp., pp. 61–67, 1990.*

* cited by examiner

Primary Examiner—Stephen S. Hong
Assistant Examiner—Cesar B. Paula (57) ABSTRACT

A workflow system and program for organizing the time and priorities of a user, wherein the information input by a user into a spreadsheet is generated by the program into a bar graph. It is possible for a user to revise the spreadsheet at any time, and the program will update the bar graph accordingly. In a further embodiment, it is possible for multiple users to be connected together via a computer network. Some users are classified as secondary users, and are primarily employees. Secondary users have access to their respective spreadsheets and bar graphs. One user is classified as a primary user, and is generally a manager. The primary user has access to two windows. In the first window, all of the spreadsheets of the secondary users are displayed. The primary user can modify the data in the spreadsheets and the program will update the bar graphs accordingly. The primary user has access to a second window wherein the bar graphs of the secondary users are displayed such that the progress of any task that is divided between multiple secondary users is evident.

1 Claim, 12 Drawing Sheets

TIME MANAGEMENT WORKFLOW SOFTWARE

SUMMARY OF THE INVENTION

The principle embodiment of the present invention introduces a workflow software wherein data input by a user into a spreadsheet is computer generated into a bar chart. The invention makes available to a user a graphical display of a priority time management system.

There are two windows available to a user. The first window, referred to as the "spreadsheet window", is primarily used for inputting data. The second window, referred to as the "bar chart window", is primarily an output window. The output is determined by the criteria of the "spreadsheet window".

The "spreadsheet window" contains a spreadsheet which is divided into multiple rows and columns. The first five columns are labeled as follows: "To-do" item, Priority, Time, Continuous, Deadline. A user inputs into the cells of each column the required data.

The "To-do" item column is a list of all of the tasks a user must execute. The Priority column is a rating of importance of each "To-do" item. The Time column is the time required to complete each "To-do" item. The Continuous column designates whether a "To-do" item must be completed in one continuous period of time, or if it may be broken down into various discrete segments of time. The Deadline column is the date by which each "To-do" item must be completed. A user may add data or modify existing data in the spreadsheet at any time. The computer application will re-generate the bar graph according to the new input.

The "bar chart" window contains a bar graph. The bar graph consists of a y-axis and an x-axis. The "To-do" items are listed vertically along the y-axis, and the x-axis is time. The x-axis is divided into blocks representing days; each block is further divided into equal segments representing the hours of a typical work day.

The bars are plotted according to the variables Priority, Time, and Deadline from the spreadsheet. The bars indicate when a user is to begin and to finish the corresponding task. Tasks which are "discontinuous", are divided into various segments of time, and spread over the days leading up to the deadline. The bars are color coded such that each "To-do" item has a distinct color based upon its priority.

A user may reposition any of the bars of the graph by using a mouse and standard drag and drop methods, if the computer generated graph is not suitable for the user.

It is also possible to click with a mouse on a bar to input to the computer whether or not a task has been completed or not.

In a further embodiment of the present invention, multiple users are connected via a computer network. A user is classified as either a secondary user, which may be an employee, or as a primary user, which may be a manager.

A secondary user has access to the two windows as described in the principle embodiment, i.e. the "spreadsheet window" and the "bar chart window". A secondary user inputs data into the spreadsheet, and the computer application generates the bar graph, in an identical manner as in the principle embodiment. A primary user has access to all of the spreadsheets and the bar charts of the secondary users. A primary user has access to two windows. In the first window, all of the spreadsheets are partially displayed. Scrolling arrows permit a primary user view a secondary user's entire spreadsheet. In this window, a primary user is able to modify data or add data to the spreadsheets of the secondary users. As in the principle embodiment, the computer application regenerates the bar graphs accordingly.

All of the bar charts of the secondary users are displayed in a second window. The bar charts are vertically presented, such that a primary user can evaluate the workflow of tasks divided between multiple secondary users. The present invention makes available to a primary user an actual workflow line which connects tasks which are contingent upon one another. Thus, the synchronization of a project or assignment, that requires multiple secondary users (employees) is obvious.

The prior art describes simple workflow applications for the time management of a particular project. Examples of these applications are: MacProject, Delegator (Madrigal Software) and Maverick (Maverick Development). These applications enable a user to organize the timetable for a project, assignment, or task, however they do not take into account the schedules of the people involved. People perform many tasks at the same time that may or may not be involved with any specific project, yet this is not factored into these applications. The present invention makes available to a user all of the tasks, assignments and projects that must be completed, by displaying them in a graphical format. A user is presented with a timetable of when to begin and when to finish all tasks, and is therefore able to modify the schedule as necessary. The essence of the present invention is to organize the time of users, such that the result is the synchronization of projects.

BRIEF DESCRIPTION OF THE DRAWINGS

FIG. 2b-1 shows the revised spreadsheet and bar chart

DETAILED DESCRIPTION OF THE PREFERRED EMBODIMENT

The principle embodiment of the present invention introduces a graphical display of a workflow system. The invention consists of a graphically represented priority time management system for a user, wherein the application generates a bar graph determined by data input by a user into a spreadsheet. Thus, a bar graph displays a schedule for a user.

In a further embodiment of the present invention, multiple users are linked together via a computer network. Users are categorized as primary or secondary: a primary user may be a manager; a secondary user may be an employee. In an identical manner as in the principle embodiment, the secondary users input data into a spreadsheet and the computer application generates a bar graph. The invention permits the primary user to access the spreadsheets and bar graphs of the secondary users. The primary user is able to modify the data in the spreadsheets, and the bar charts are updated automatically.

The invention also makes available to the primary user, a graphical relational workflow chain connecting the bar graphs of multiple secondary users.

Figure 1:
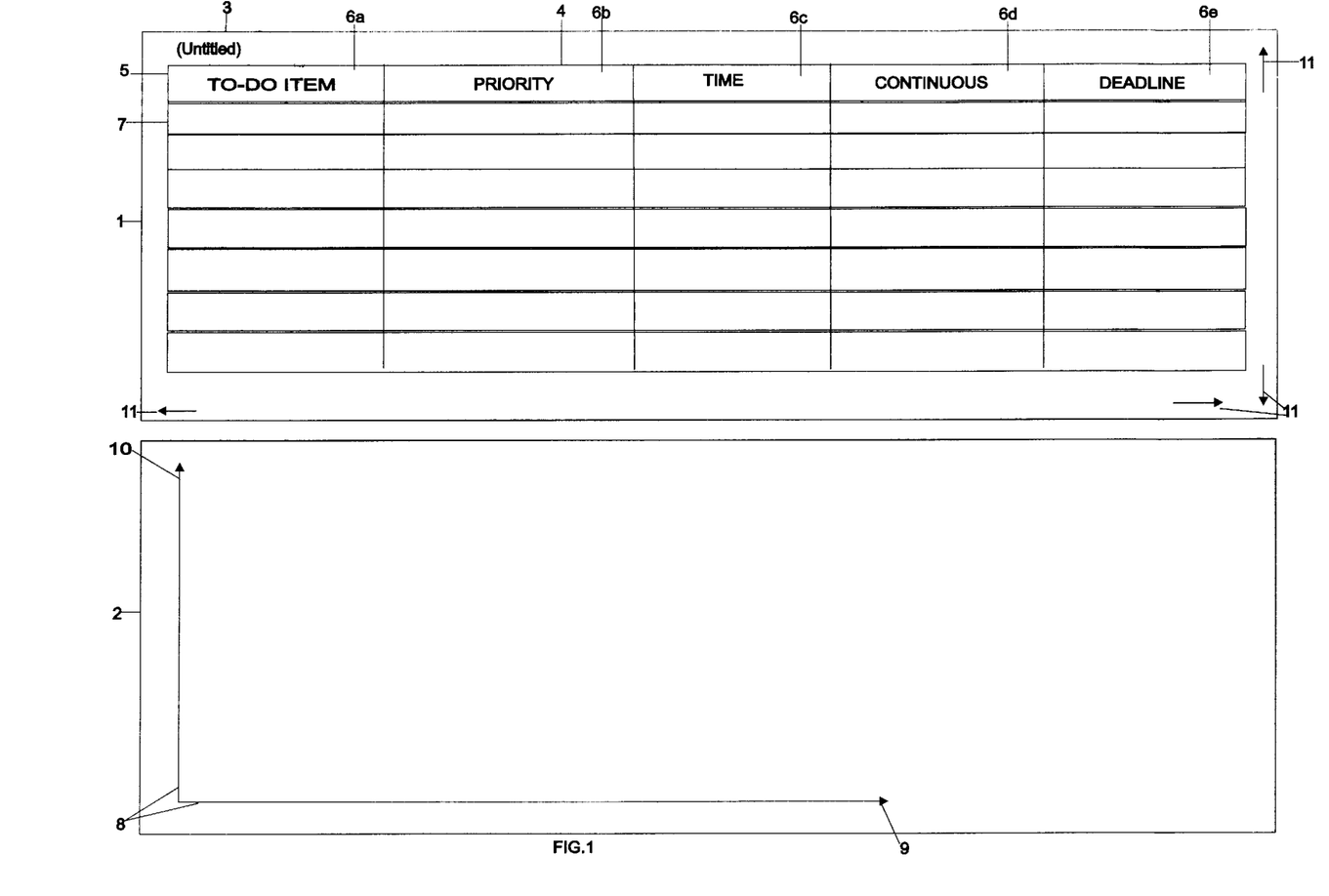
FIG. 1 schematically depicts the two windows available to a user in accordance with the invention

In order to provide a thorough understanding of the principle embodiment, reference is made to FIG. 1, which illustrates the layout of the spreadsheet and bar graph, which are also referred to as the "to-do" list window 1, and the bar chart window 2, as seen on the computer monitor. FIG. 1 shows two empty windows 1 and 2, containing the spreadsheet and bar chart, respectively, prior to the development of the spreadsheet. Window 1 is used primarily for input, and window 2 primarily generates output determined by the criteria of window 1.

Referring to window 1, it includes an overall title bar 3 for displaying the name of the application and the current file. There is no file or title associated with FIG. 1.

The spreadsheet 4 is divided into multiple rows 5 and columns 6a through 6e.

The intersection of a row and column is a cell 7, where the address of a cell is defined in the same way as in other spreadsheet applications. The user inputs the necessary data, either text or numeric, into each cell, as defined by its address.

The first five columns, 6a through 6e, are labeled: "To-do" item, Priority, Time, Continuous, Deadline, respectively.

A user enters all tasks to be completed into the "To-do" item column 6a.

Into the "Priority" column 6b, a user inputs a rating of importance for each "Todo" item.

A user inputs the total amount of time required to execute each "To-do" item into the "Time" column 6c.

A user assigns in the "Continuous" column 6d whether or not a task must be completed in one continuous period of time, or if it may be broken down into multiple stages over many days.

Into the "Deadline" column 6e a user inputs the date by which the "To-do" item must be completed.

Window 2 of FIG. 1 depicts the bar chart window. The bar chart 8 is comprised of an x-axis 9 and a y-axis 10. The x-axis 9 represents time, as determined from the criteria of the spreadsheet. Along the y-axis 10 the "To-do" items of column 6a are listed vertically.

The bars for the graph (not shown) are plotted according to the variables: Priority, Time and Deadline, as entered into the spreadsheet 4 by a user. The bars are color coded, such that each "To-do" item's priority has a distinct color. Scrolling bars 11 of windows 1 and 2 perform their usual functions.

The advantages of the principle embodiment of this invention are best demonstrated by an example which shows the tasks of a user.

Figure 2:
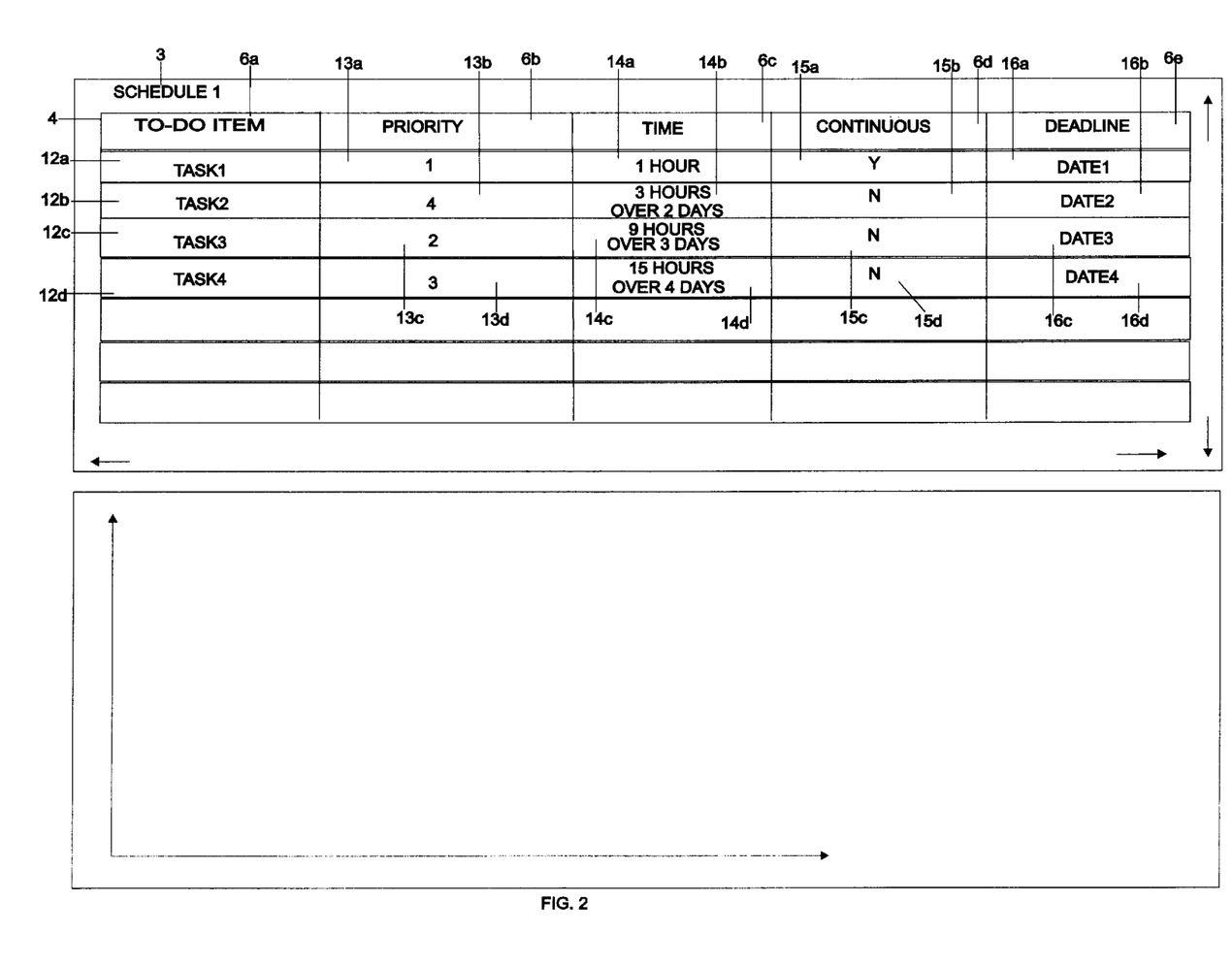
FIG. 2 illustrates the "spreadsheet window" and "bar chart" window

Referring to FIG. 2, a file called SCHEDULE 1, as shown in Title box 3, is developed as an example to disclose the invention.

The user inputs four items, Task1 12a, Task2 12b, Task3 12c and Task4 12d, into the "To-do" item column 6a. The input data may be a single word or an expression, and may be numeric or text. The items may be entered randomly or sequentially.

Into the column "Priority" 6b, the rating of importance 1 13a, 4 13b, 2 13c, and 3 13d, for each "To-do" item 13a through 13d is entered, by the user. The ratings of priority range from 1 to 4, where 1 represents the highest priority and 4 represents the least priority, and consequently the last "To-do" item.

The time required to execute each task, one hour 14a, three hours over two days 14b, nine hours over three days 14c, and fifteen hours over four days 14d, are entered by the user, into the "Time" column 6c.

The user inputs Y 15a, and N 15b through 15d into the fourth column "Continuous" 6d. If the "To-do" item is continuous, i.e. that it must be completed in one continuous period of time, then a "Y" is input. Conversely, if an item is "discontinuous", i.e. that it may be completed in various discrete segments of time, then an "N" is entered.

The completion date for each "To-do" item, Date1 16a, Date2 16b, Date3 16c, Date4 16d, is input by the user into the "Deadline" column 6e.

Figure 2A:
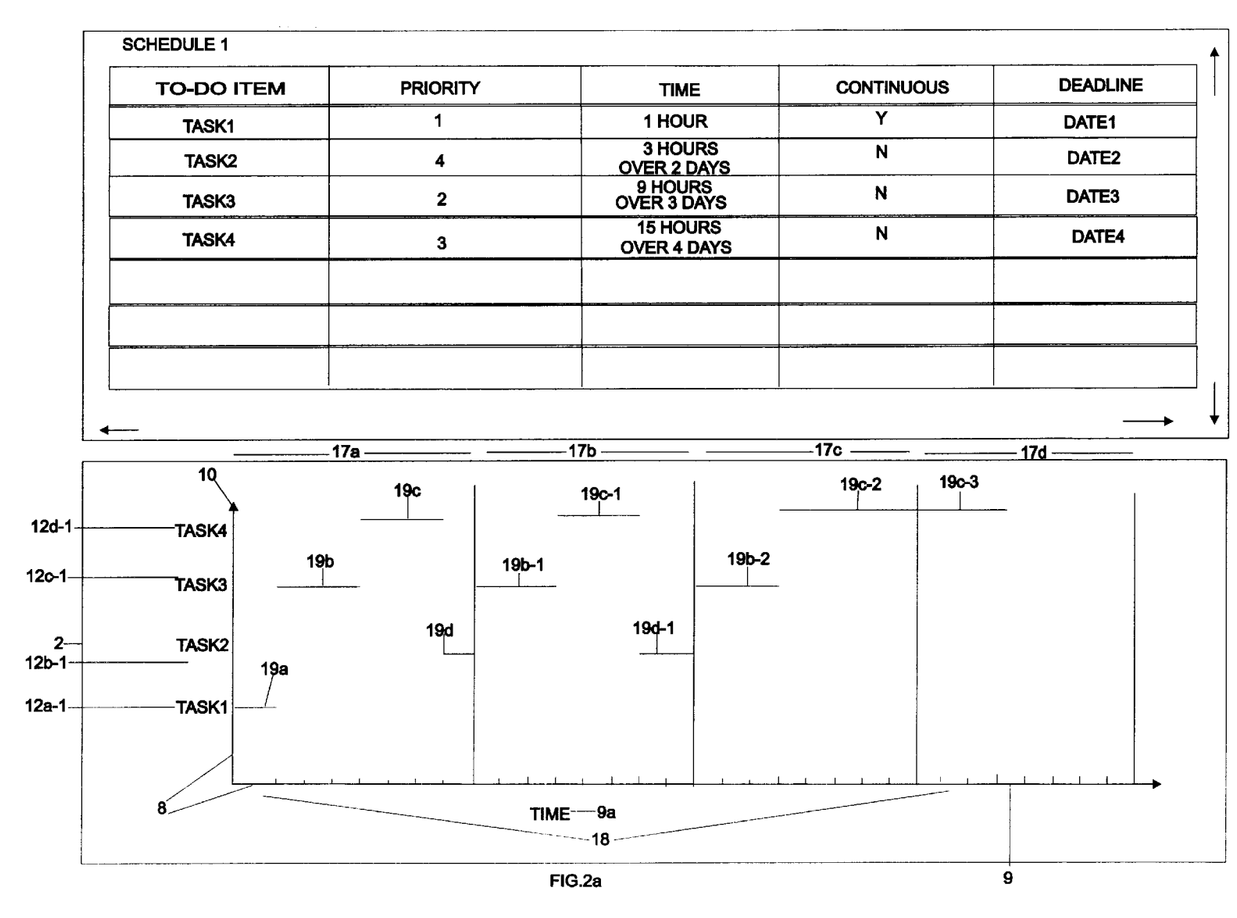
FIG. 2a shows the input data in the spreadsheet and the output data in the bar chart

After the user inputs all of the required data into the spreadsheet, the computer generates the bar chart 8 of FIG. 2a, according to the following variables as shown in FIG. 2:

Task1 12a has a priority of 1 13a (the highest priority); requires one hour of time 14a; is continuous 15a; and must be completed by Date 1 16a.

Task2 12b has a priority of 4 13b (the lowest priority); requires three hours over two days 14b to complete; is "discontinuous" 15b; and must be completed by Date2 16b.

Task3 12c has a priority of 2 13c (the second highest priority); requires nine hours over three days 14c to finish; is "discontinuous" 15c; and must be completed by Date3 16c.

The final item, Task4 12d has a priority of 3 13d (the third highest priority); requires fifteen hours over four days 14d to complete; is "discontinuous" 15d; and must be completed by Date4 16d.

Referring to FIG. 2a 2, the x-axis 9 is labeled "Time" 9a and is divided into multiple blocks representing days. Currently, the four Deadline dates, Date1, Date2 , Date3 , and Date4 ,from the spreadsheet, are represented by the areas 17a, 17b, 17c, 17d. Each block is further divided into eight, equal one hour segments 18 representing a typical work day.

The "To-do" items Task1 12a-1, Task2 12b-1, Task3 12c-1, and Task4 12d-1 are listed along the y-axis 10.

The bars 19a through 19d, 19b-1 through 19d-1, and 19b-2 through 19c-3, of the bar chart are plotted according to the variables Priority, Time, and Deadline, from the spreadsheet . The bars are color coded, such that each "To-do" item and its respective priority has a distinct color.

The bars represent the daily schedule of the user over four days. Each individual bar, 19a through 19d, 19b-1 through 19d-1, and 19b-2 through 19c-3 determines when the user is to begin and to finish the corresponding "To-do" item, and the total allotted amount of time. The computer application divides the total amount of time for tasks which are "discontinuous" over the days leading up to the designated deadline.

Using conventional drag and drop methods, a user may click a button on a mouse while the cursor is positioned over a bar, and drag the selected bar to a preferred location within the bar graph. Thus, a user is able to rearrange the bars according to personal preference, if the computer generated graph is not appropriate.

Once a task has been completed, a user clicks a button on a mouse while the cursor is positioned over the appropriate bar, and inputs to the computer whether the "To-do" item has been completed. The bar graph 8 displayed in FIG. 2*a* window 2, depicts the immediate output after a user has completed the spreadsheet 4 of FIG. 2.

The first bar 19*a* represents the "To-do" item Task1 12*a*-1 which has the highest priority; requires one hour of time; is continuous; and must be completed by the first day 17*a*. Thus, it is the first task that the user must complete.

The next bar 19*b* represents Task3 12*c*-1. This task has the second highest priority; requires nine hours to complete over three days; is "discontinuous"; and has a deadline of Date3. Thus, the computer application allots three hours, bar 19*b*, on the first day 17*a*; three hours, bar 19*b*-1, on the second day 17*b*; and three hours, bar 19*b*-2, on the third day 17*c*.

The next bar 19*c* represents Task4 12*d*-1. This item has the third highest priority; requires fifteen hours to complete over four days; is "discontinuous"; and has a deadline of Date4. Thus, the computer application assigns three hours, bar 19*c*, on the first day 17*a*; three hours, bar 19*c*-1, on the second day 17*b*; five hours, bar 19*c*-2, on the third day 17*c*; and four hours, bar 19*c*-3, on the fourth day 17*d*.

The bar 19*d* represents Task2 12*b*-1. This item has the least priority; requires three hours to complete over two days; is "discontinuous"; and must be completed by Date2. The computer application allots one hour, bar 19*d*, on the first day 17*a*, and the final two hours, bar 19*d*-1, on the second day 17*b*.

To better explain the present invention, an example of a user not completing a task is disclosed.

Figure 2B:
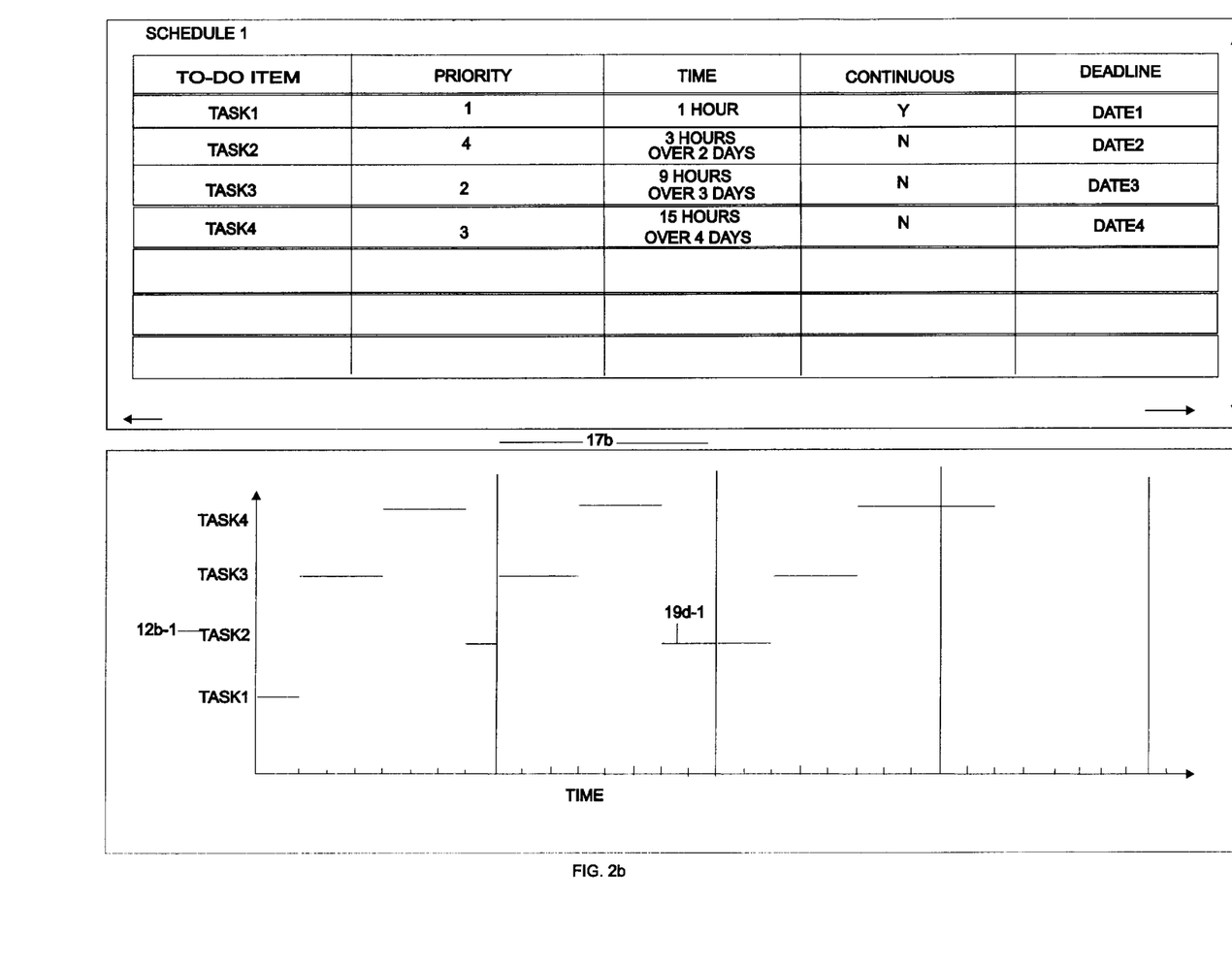
FIG. 2b shows an incomplete "To-do" item

Referring to FIG. 2*b* 17*b*, Task2 12*b*-1 was not completed by the deadline Date2. A user clicks with a mouse (not shown) on bar 19*d*-1, and inputs to the computer application that Task2 is not finished, and that an additional two hours are necessary to complete this task, and that the deadline has been extended to Date3.

Figure 2B:
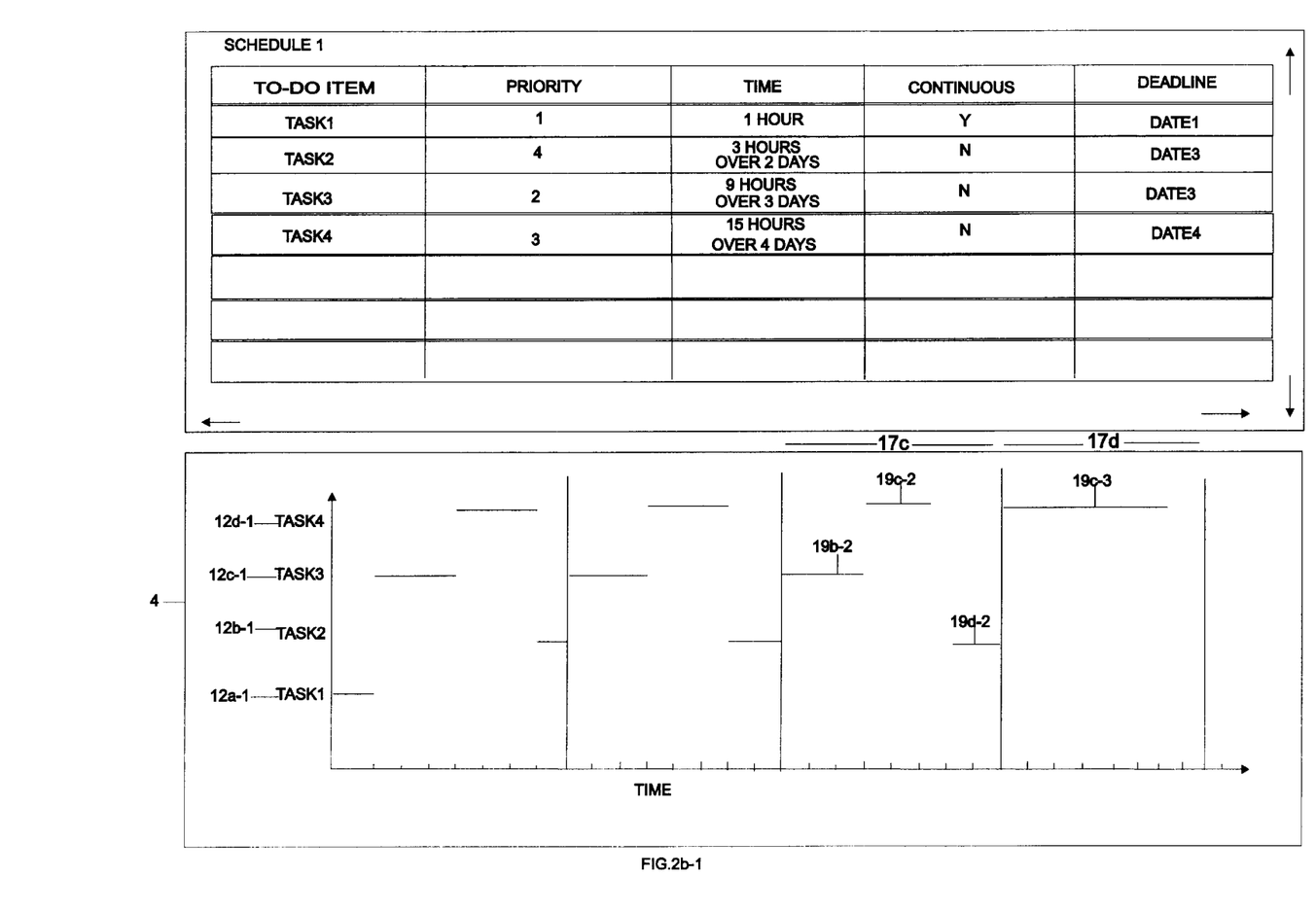

Referring to FIG. 2*b*-1, the computer application re-organizes the third day 17*c* and the fourth day 17*d*. Task3 12*c*-1 remains as the first task to be executed, as shown by bar 19*b*-2. Task4 12*d*-1 remains as the second task to be performed, as shown by bar 19*c*-2, but the hours required for this task, on this day, have been reduced in order for Task2 to be completed. Thus, Task2 12*b*-1 is allotted the final two hours of the third day, as represented by the bar 19*d*-2. On the fourth day 17*d*, Task4 is allotted the remaining two hours from the previous day, such that the total amount of hours for this day have been increased, as shown by the bar 19*c*-3.

The spreadsheet 4 of FIG. 2*b*-1 remains the same, unless a user inputs new data to reflect the modifications for Task2.

To better illustrate the present invention, an example of a user adding a task to the original spreadsheet 4 of FIG. 2 is disclosed.

Figure 3:
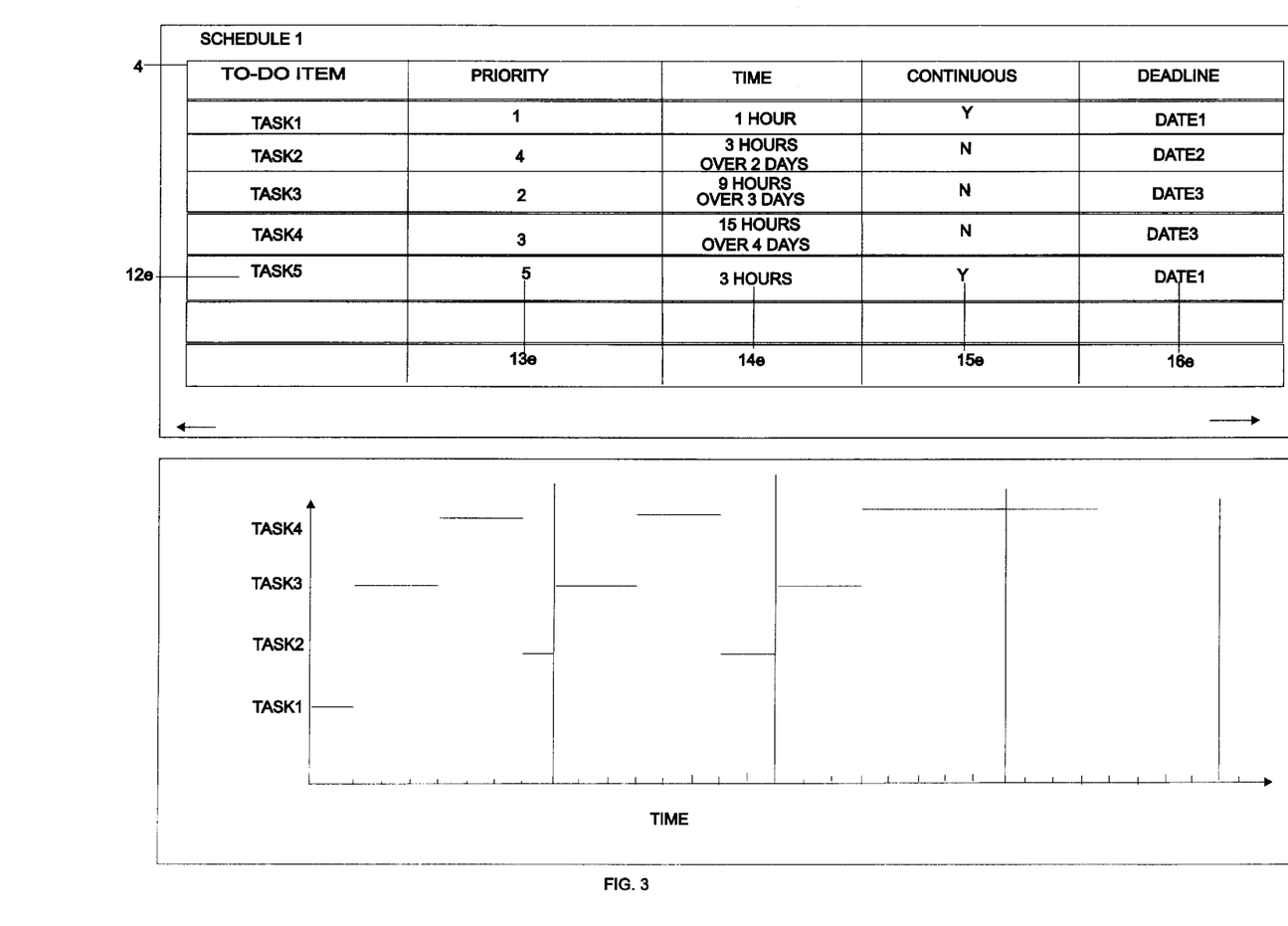
FIG. 3 shows the addition of a "To-do" item

Referring to FIG. 3, a user has input into the spreadsheet 4, an additional "Todo" item Task5 12*e*. The new task has a priority of 5 13*e*; requires three hours of time to complete 14*e*; is continuous 15*e*; and has a deadline of Date1 16*e*.

Figure 3A:
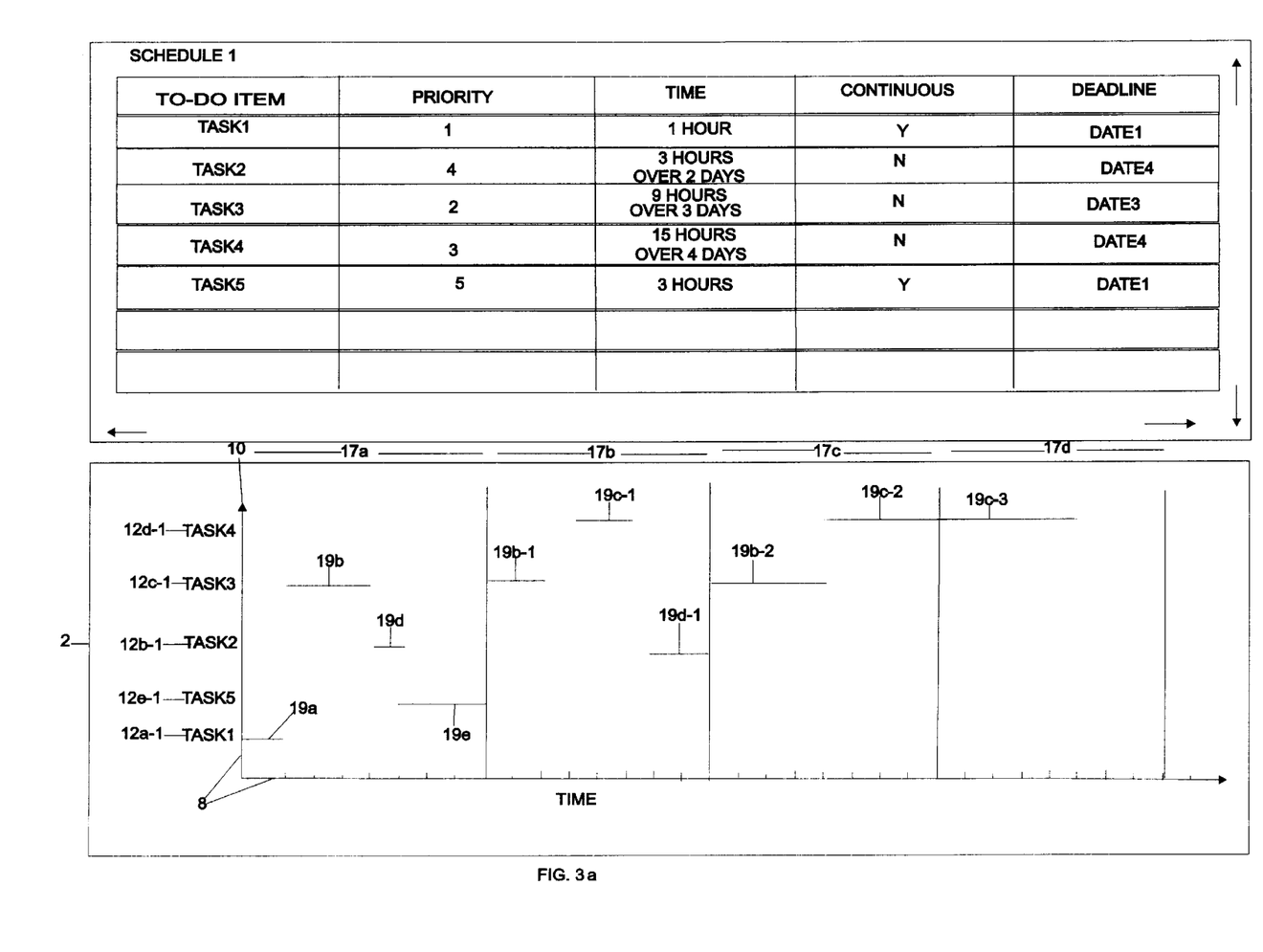
FIG. 3a shows the revisions to the spreadsheet and bar graph after the addition of data FIG. 4 schematically depicts the two windows available to the primary user

The bar graph 8 in window 2 of FIG. 3*a* is regenerated in conjunction with the modifications of the spreadsheet 4 of FIG. 3. Task5 12*e*-1 has been added to the y-axis 10.

Task1 12*a*-1 and Task3 12*c*-1 remain as the first and second "To-do" items, to be executed on the first day 17*a*. The bars 19*a* and 19*b* represent, respectively, the time required for these tasks. The third "To-do" item to be performed is Task2 12*b*-1. The time required for this task is indicated by the bar 19*d*. Finally, Task5 12*e*-1 is executed, as represented by the bar 19*e*.

The following days 17*b*, 17*c*, 17*d* are unchanged, except that Task4 12*d*-1 is assigned an increased number of hours on the fourth day 17*d*.

In a further embodiment of the present invention, a workflow system is introduced which makes available a proactive analysis of multiple spreadsheets and bar charts. Multiple users are connected via a computer network, wherein one user is a primary user, and may be a manager; the other users are secondary users, and may be employees. The invention makes available to the primary user a workflow chain of the secondary users' bar graphs, contained in one window. Thus, the primary user is presented with a concise, graphical display of the progress of any specified task.

As in the principle embodiment, the secondary users complete their respective spreadsheets and the computer application generates their bar charts. The secondary users only have access to their respective input windows and output windows. These windows are linked together in a computer network, which permits the primary user to access any of the windows of the secondary users. The primary user is able to modify data or add data to the spreadsheets of the secondary users, in an identical manner to that of the principle embodiment.

Figure 4:
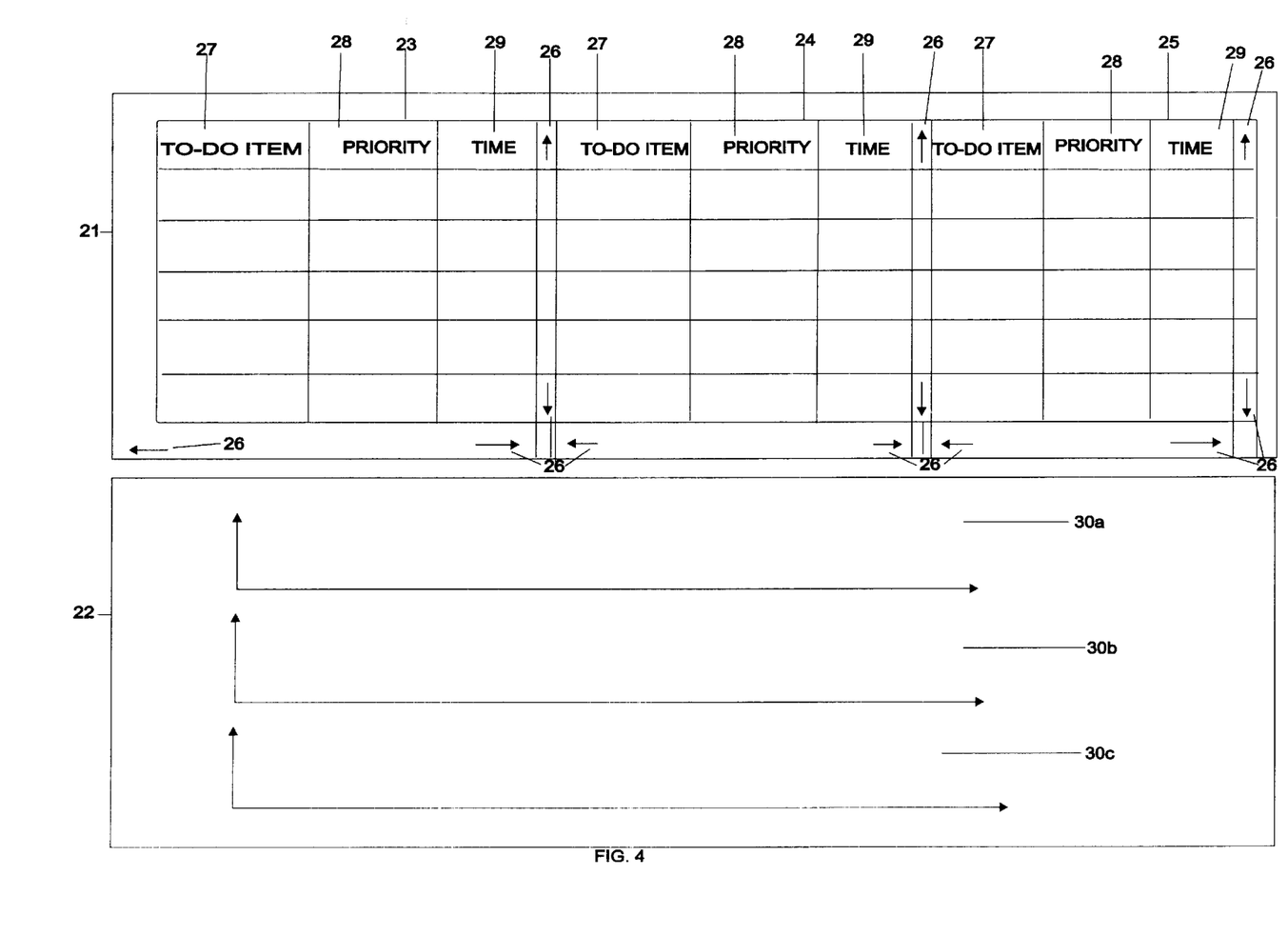

In order to provide a thorough understanding of this aspect of the present invention, reference is made to FIG. 4 which illustrates the layout of the primary user's computer screen. The screen is divided into Window 1 21 and Window 2 22. Window 1 21 contains the empty spreadsheets 23, 24, 25 of the secondary users. The spreadsheets are displayed in such a manner that essentially only the "To-do" items lists 27, the Priority columns 28 and the Time columns 29 of the secondary users are shown. However, in a conventional manner, the primary user may click with a mouse on the scrolling arrows 26, in order to view the Continuous columns, and the Deadline columns. It is in Window 1 where the primary user modifies or adds data to the secondary users' spreadsheets.

Window 2 22 contains the empty bar graphs 30*a*, 30*b*, 30*c* of the secondary users. The bar graphs are vertically aligned and are labeled (not shown) with the name of the secondary user. The bar graphs are identical to those of the principle embodiment, but are reduced in size. It is possible for a primary user to have the computer application generate a line joining multiple tasks in order to observe the workflow between these tasks.

The advantages of this aspect of the present invention are best demonstrated by an example which shows the workflow of multiple tasks between three secondary users.

Figure 5A:
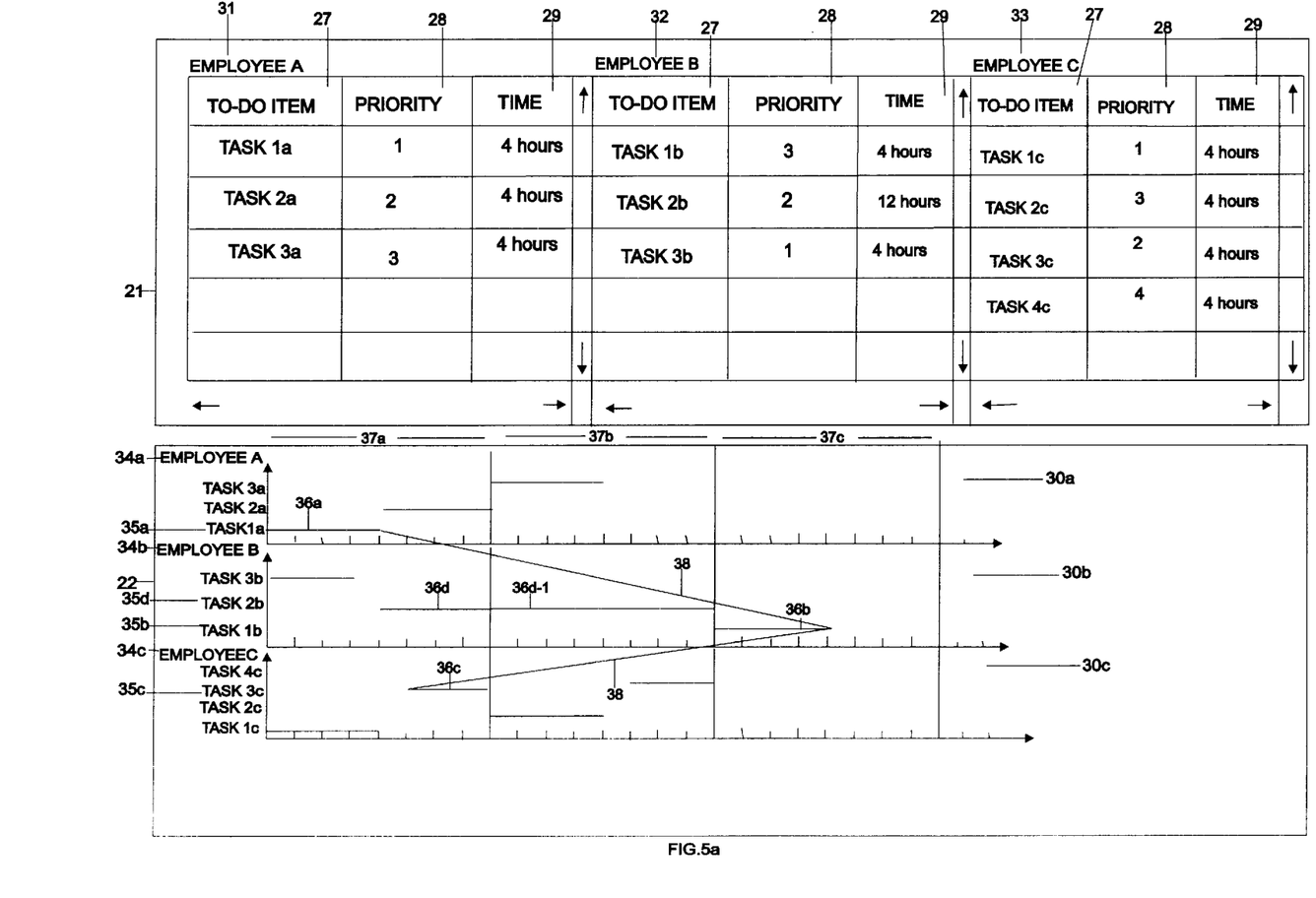
FIG. 5a depicts the input data in the spreadsheet for three employees and the output data in the bar charts

Referring to FIG. 5*a*, Window 1 21 depicts the "To-do" item columns 27, the Priority columns 28, and the Time columns 29 of Employee A 31, Employee B 32, and Employee C 33. Thus, the primary user can observe how each of the three employees has evaluated each of their assigned tasks.

Window 2 22 of FIG. 5*a* depicts the three bar graphs 30*a* through 30*c* of the three secondary users. Each bar graph is labeled with the name of the secondary user 34*a* through 34*c*.

To further explain this aspect of the present invention, a project X consisting of Task 1a 35*a*, Task 1b 35*b*, and Task 3c 35*c* is disclosed. The tasks which comprise project X are contingent upon one another, such that the completion of one depends upon the completion of another. For example, Task 1b 35*b* cannot be completed before Task 1a 35*a*.

To evaluate the progress of project X, a primary user refers to Window 2 22 of FIG. 5*a*, and compares the bars corresponding to these tasks. Task 1*a* 35*a*, as represented by bar 36*a*, in the bar graph 30*a* of Employee A 34*a*, is executed during the first four hours of the first day 37*a*. Task 1b 35*b*, as represented by bar 36*b*, in the bar graph 30*b* of Employee B 34*b*, is executed in the first four hours of the third day 37*c*. The final task, Task 3*c* 35*c*, as represented by bar 36*c* in the bar graph 30*c* of Employee C 34*c*, is executed in the final four hours of the first day 37*a*.

Figure 5B:
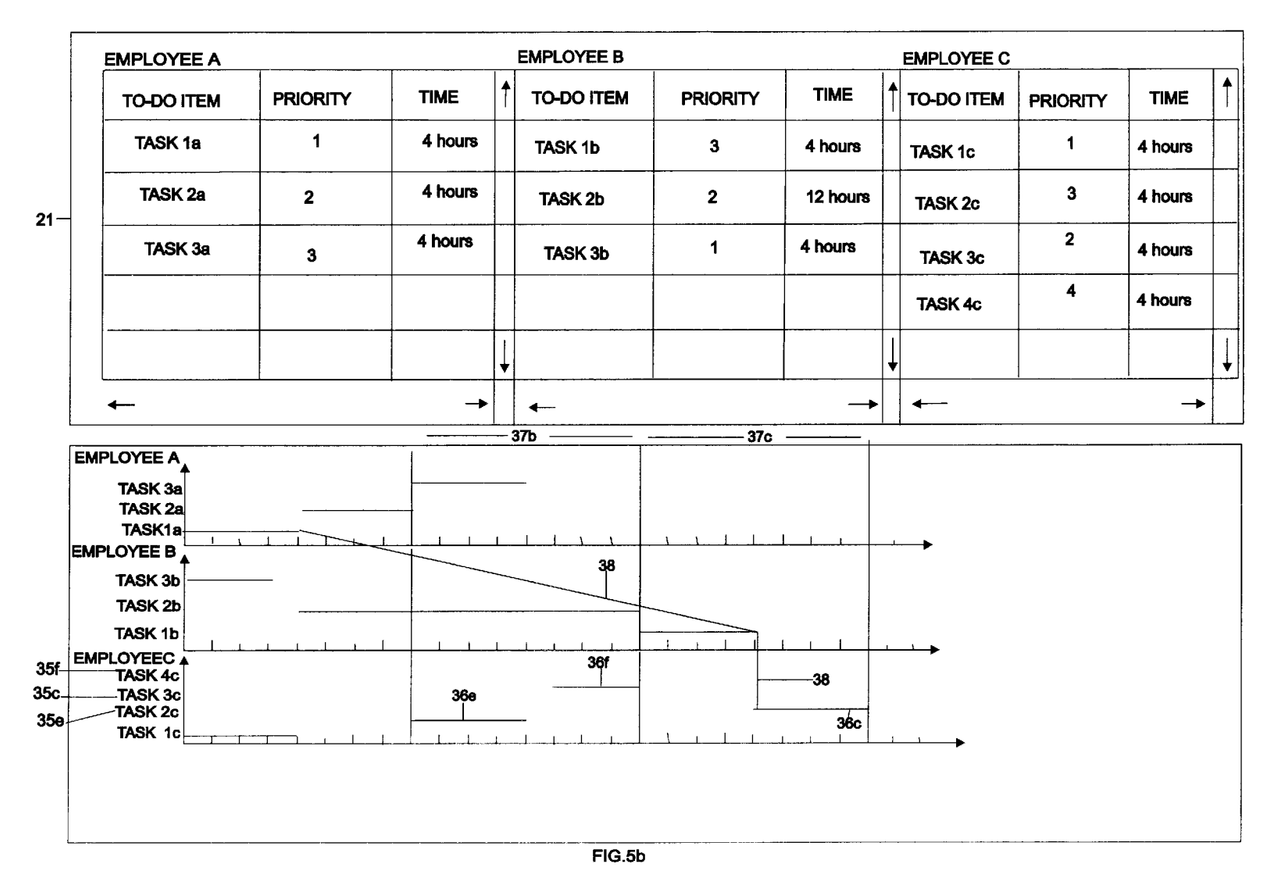
FIG. 5b depicts the revised workflow line

The workflow line 38 linking these three tasks clearly illustrates that the project X is not synchronized properly. By reason of the contingency between the tasks, it is evident that specific stages of project X must be modified, because Task 3*c*, bar 36*c*, cannot be executed prior to Task 1b, bar 36*b*. Thus, referring to FIG. 5*b*, a primary user may use a mouse to drag bar 36*c* to the third day 37*c* in the final four hours, as shown in FIG. 5*b*. The workflow line 38 now correctly illustrates the contingencies of the tasks necessary for project X.

To provide a better explanation of this aspect of the present invention, an example of a primary user managing the activities of the secondary users in such a fashion as to complete project X quicker. The primary user does so by changing the priorities for the "To-do" items of the secondary users.

Figure 5C:
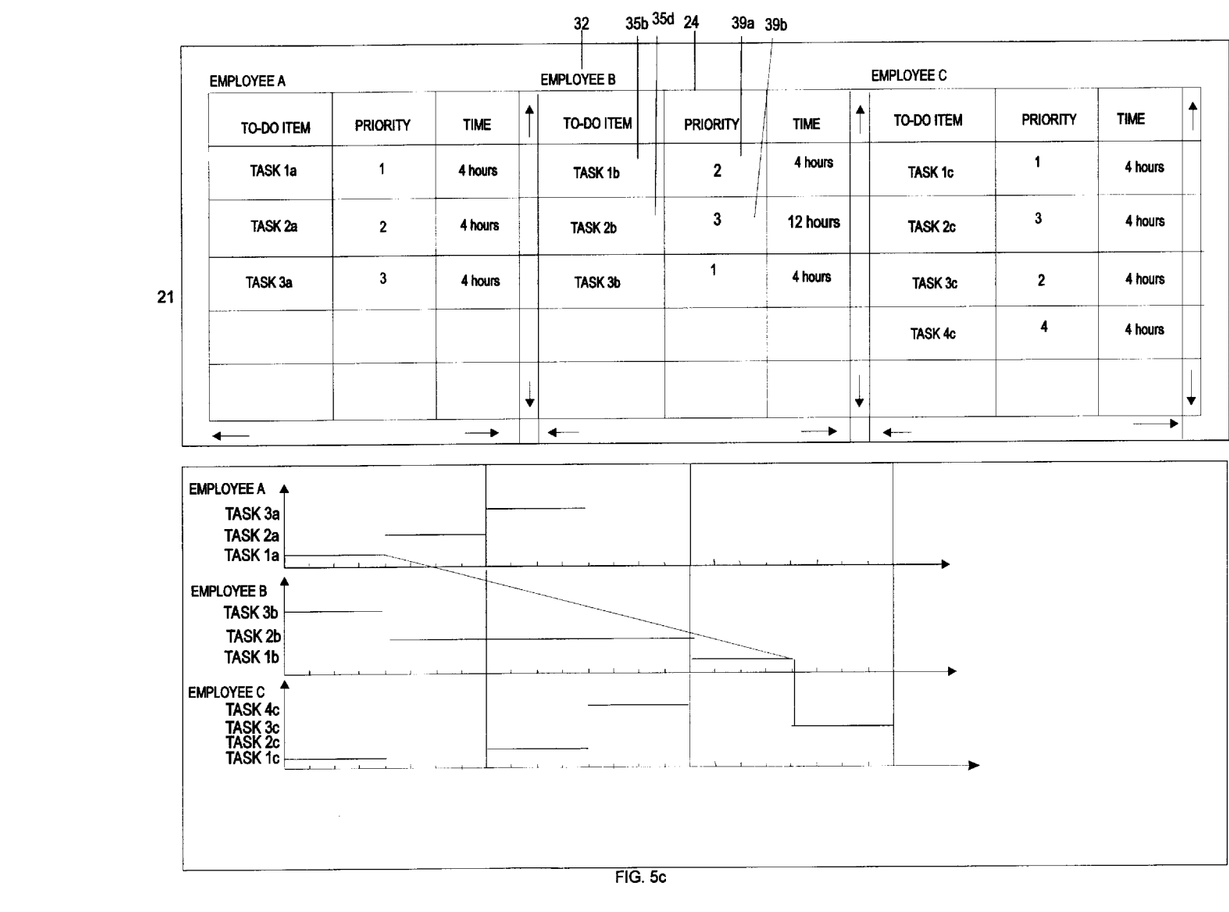
FIG. 5c illustrates modifications in the priorities of two tasks

By referring to FIG. 5*b*, a primary user decides that project X is to be completed by the second day 37*b*. In order to make this modification, a primary user adjusts the priorities of Task 1b 35*b* and Task2b 35*d* of Employee B 32, as shown in FIG. 5*c* spreadsheet 24. The priority for Task 1b 35*b* is increased to 2 39*a*, and the priority for Task 2b 35*d* is decreased to 3 39*b*.

Figure 5D:
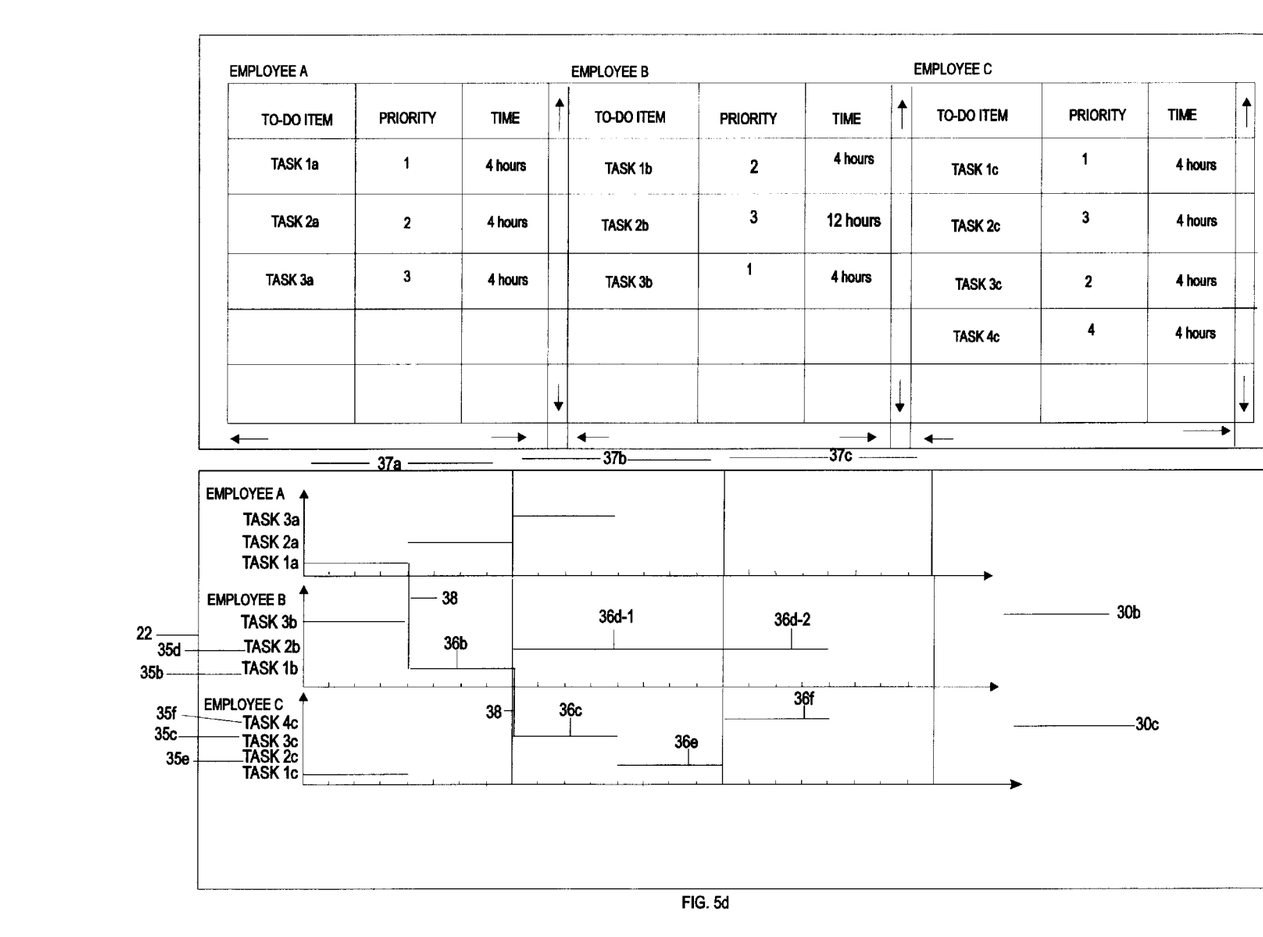
FIG. 5d depicts the revised workflow line after priorities have been modified

Referring to FIG. 5*d* Window 2 22, the computer application has regenerated the bar graph 30*b* to reflect the modifications. Task 1b 35*b* had originally been allotted four hours of time on the third day 37*c*, as represented by the bar 36*b* of FIG. 5*a*. The increase in priority of Task *1b* 35*b* moves it forward to be executed on the first day 37*a*, as represented by the bar 36*b* of FIG. 5*d*. The time for Task 2*b* 35*d*, as represented by the bars 36*d* and 36*d*-1 of FIG. 5*a*, has been postponed to the second day 37*b* and third day 37*c*, as represented respectively, by the bars 36*d*-1 and 36*d*-2 of FIG. 5*d*.

To modify Task 3*c* 35*c*, a primary user may drag and drop with a mouse, the bar 36*c* of the bar graph 30*c* of FIG. 5*b* to the required location. Referring to FIG. 5*d*, the bar 36*c* has been "dropped" in the second day 37*b*. Thus, the computer application automatically relocates Task 2c 35*e* to the final four hours of the second day 37*b*, as represented by the bar 36*e* of FIG. 5*d*. Similarly, Task 4c 35*f* is relocated to the third day 37*c*, as illustrated by the bar 36*f* of FIG. 5*d*.

The workflow line 38 which links these three tasks clearly illustrates the workflow desired by the primary user.

This invention allows a manger to manage more effectively the priorities of items of work to be performed by employees. In the previous example, as it is sometimes the case, the manager could have been under pressure to finish project X sooner. The manager may have done the same things, but have told Employee B to do Task 1b sooner, and have told Employee C to do Task 3c sooner. The difference by using this software however, is that in this case, the manager is forced to change the priority levels of the work to be performed by the employees.

While the invention has been shown and described with reference to the preferred embodiment thereof, it will be understood by those skilled in the art that the above and other changes in form and detail may be made therein without departing from the spirit and scope of the invention.

I claim:

1. A workflow software method implemented on a computer comprising steps of:

data input by a user into a spreadsheet is generated by the (application)workflow software method into a (bar graph) graphical display;

(five columns of the spreadsheet contain items to be performed by the user,) items input into the spreadsheet include items to be performed, (the) a priority of each item, (the) and a time required to perform each item (if each item is continuous, the deadline for each item);

after the user has input all of the data into the spreadsheet, the computer generates a time chart in the form of a (bar graph) graphical display according to all of the said input variables of the spreadsheet;

the (bar graph) graphical display shows when the user is to begin and to finish each (task) item.

\* \* \* \* \*